Figure 1:
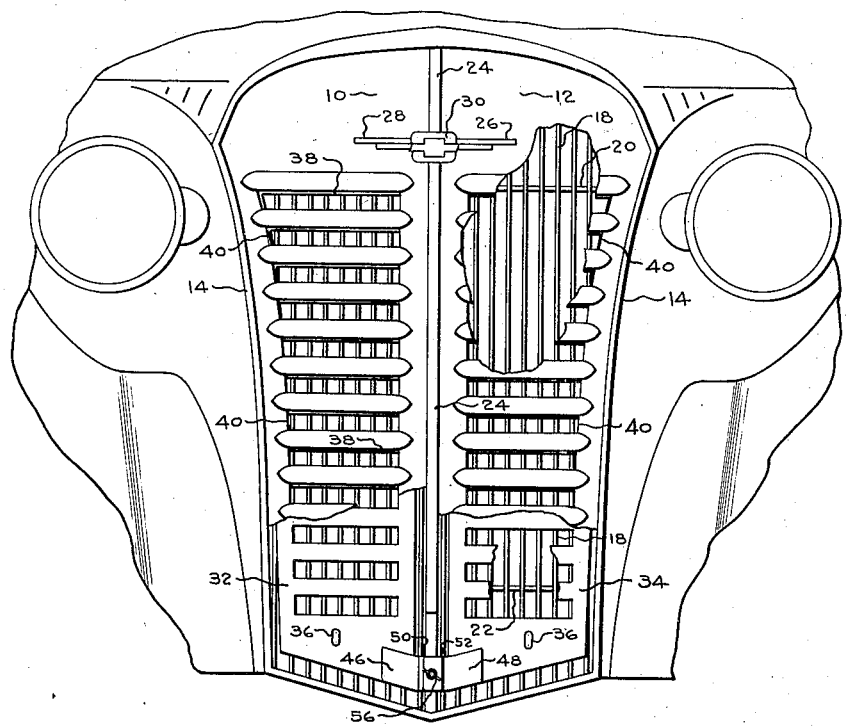

Oct. 18, 1938.  E. G. PETERSEN ET AL  2,133,924
SHUTTER CONSTRUCTION
Filed Feb. 24, 1937   3 Sheets-Sheet 1

Inventors
EDGAR G. PETERSEN AND
FREDERICK E. BEACH
By Beaman & Langford
Attorney Oct. 18, 1938.　　　E. G. PETERSEN ET AL　　　2,133,924
SHUTTER CONSTRUCTION
Filed Feb. 24, 1937　　　3 Sheets-Sheet 3

Inventors
EDGAR G. PETERSEN AND
FREDERICK E. BEACH
By Beaman & Langford
Attorneys Patented Oct. 18, 1938

2,133,924

UNITED STATES PATENT OFFICE 2,133,924

SHUTTER CONSTRUCTION

Edgar G. Petersen, Jackson, and Frederick E. Beach, Detroit, Mich., assignors to Ryerson & Haynes, Inc., Jackson, Mich., a corporation of Michigan Application February 24, 1937, Serial No. 127,366

1 Claim. (Cl. 189—61)

The present invention relates to shutter structure particularly designed for attachment forward of the radiator grille fronts of automobiles. More specifically, the invention is primarily concerned with shutter structure of the type installed as an accessory and used only during the winter months. In this type of shutter structure attractiveness, compactness, low cost of production, ease of installation and removal, and regulation are matters of principal concern.

According to the present invention the shutter structure comprises two entirely separable sheet metal body sections each capable of being attached to the radiator grille and to cover one-half the ventilation area forward of the radiator as defined by the outer surface of the grille. Each of these sections is preferably held in position upon the outer surface of the grille through snap-on attachment clips carried upon the rear side of each section and engageable with parts of the grille structure. For regulating the air flow through the shutter sections, each section is provided with adjustable openings which may be under the control of pivoted shutter slats, louvers, dampers, or the like. In the preferred form of the invention as herein illustrated the openings in each shutter section are regulated by an axially slidable damper located on the underside of the shutter sections and directly adjacent the radiator grille structure. As it is desirable to regulate the opening in the sections simultaneously, simple means have been provided for interconnecting the dampers even though the sections are angularly disposed to each other necessitated by the pointed or stream line contour of the radiator grille.

In the drawings

Figure 2:
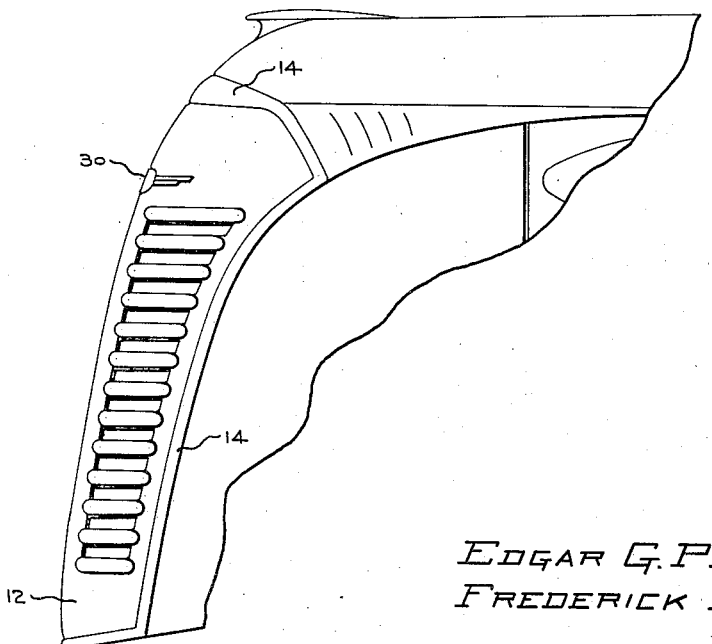
Figure 3:
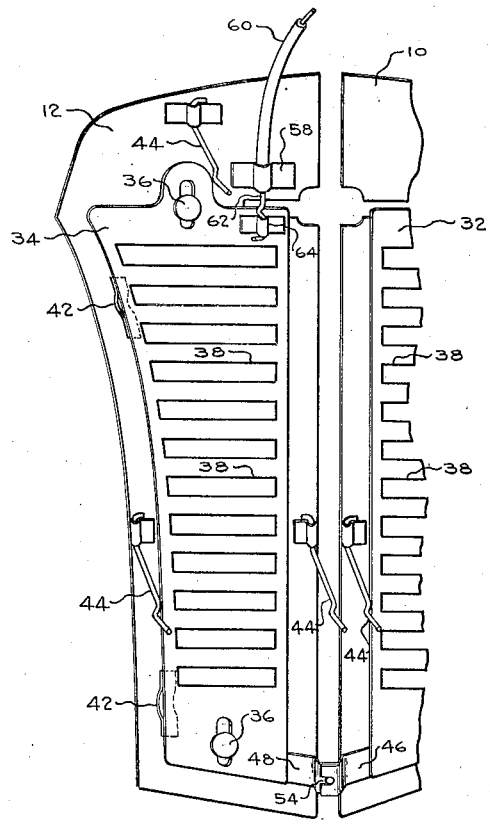
Figure 5:
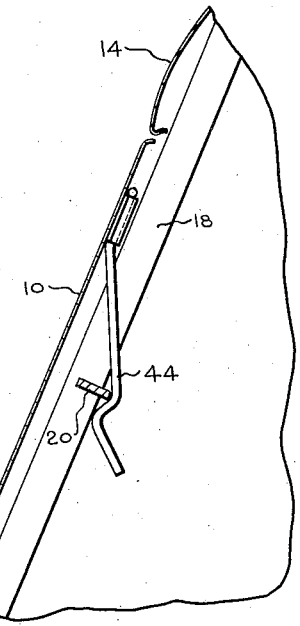
Figure 4:
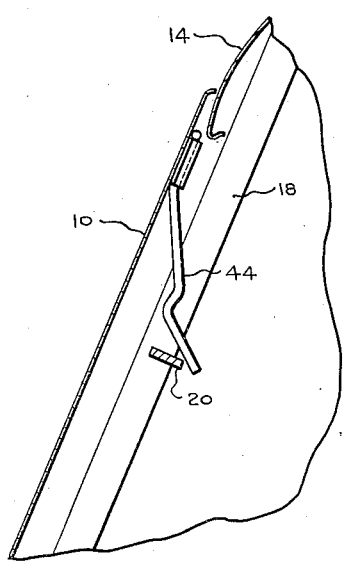
Figure 6:
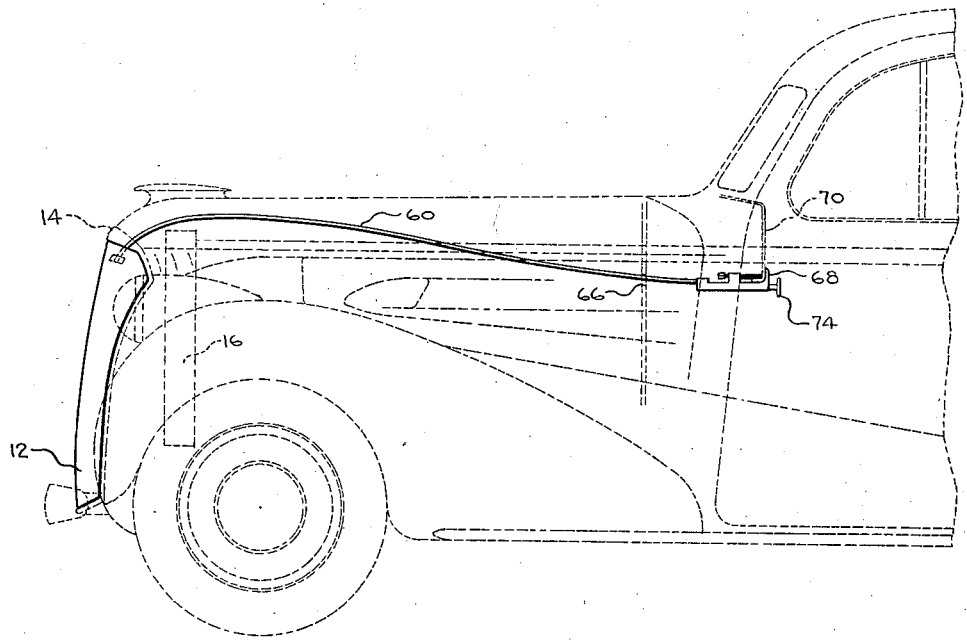
Figure 7:
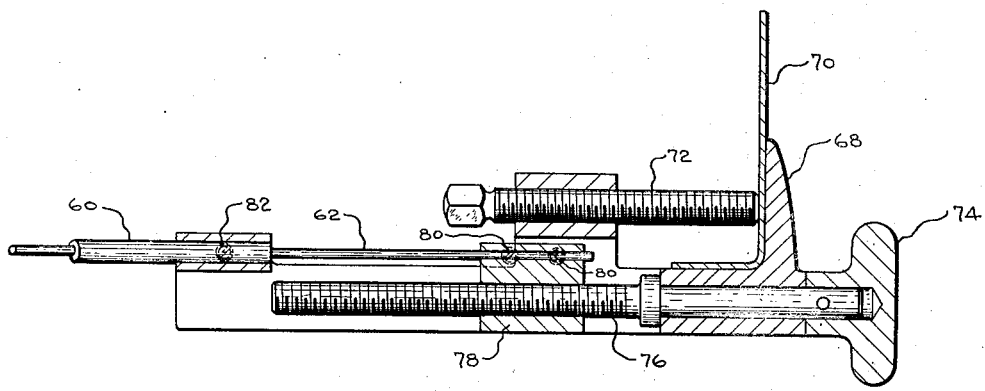

Fig. 1 is a front elevational view showing the shutter in position, parts of the shutter being shown broken away, Fig. 2 is a side elevational view of the shutter in position, Fig. 3 is a view taken from the rear side of the shutter parts as they appear prior to installation, Figs. 4 and 5 are fragmentary sectional views through the shutter and radiator grille showing the manner of attachment, Fig. 6 is a side elevational view of an embodiment in cross-section showing the manner of installation of the shutter control, and Fig. 7 is an enlarged view of the shutter control mechanism.

Referring to Fig. 1 the shutter preferably comprises two separate outer sheet metal sections 10 and 12. The outer contour of the sections in practice may conform to the inner marginal edge of the radiator shell 14 which projects forwardly of the radiator 16 or it may overlap the same. As illustrated the shutter is fixed to the grille made up from vertical slats 18 with horizontal supporting members 20 and 22. As shown the sections 10 and 12 are positioned upon opposite sides of a central ornamental vertical bar 24, part of the grille structure, and each section is shaped at 26 and 28 to accommodate the emblem 30 of the automobile manufacturer which is carried by the grille structure.

Positioned upon the rear side of the sections 10 and 12 are dampers 32 and 34 supported for vertical slidable movement upon pin and slot connections 36 (see Fig. 3). The dampers 32 and 34 have spaced openings 38 which conform in shape and spacing to the openings 40 in the sections 10 and 12. In Fig. 1 the dampers 32 and 34 are shown in partial open position; the openings 38 of the dampers 32 and 34 being in full alignment with the openings 40 when the dampers are slid upward to the full limit of the pin and slot connections 36 and completely closing the openings 40 when slid downward to the lower limits of the connections 36. Flat springs 42 may be inserted between the sections 10 and 12 and their associated dampers 32 and 34 to prevent any rattle.

To enable the shutter sections 10 and 12 and their associated parts to be quickly applied and removed from the grille, we preferably employ a plurality of spring detents 44 which are anchored to the rear side of the sections 10 and 12. These detents 44 are so positioned as to come between the slats 18 of the grille and upon downward movement of the sections 10 and 12, which are separately applied to the grille, the detent will snap back of the horizontal reinforcement members 20 and 22 in the manner shown in Figs. 4 and 5 to firmly position the sections 10 and 12 upon the grille structure. Preferably the sections 10 and 12 are slightly dished to enable the marginal edges thereof to engage with the surface of grille yet position the central portion of the sections so as to provide clearance between the sections and the grille for free operation of the dampers 32 and 34.

In the case where the dampers 32 and 34 are to be controlled from the driver's seat, connector plates 46 and 48 are attached to the dampers 32 and 34 having ends 50 and 52 which overlap when the sections 10 and 12 are in associated relation upon the grille. Preferably the end 50 is slotted at 54 and an adjustable pin 56 threaded in the end 52 projects through the slot 54 to connect the dampers 32 and 34 together to the extent that vertical movement of one is imparted to the other. Fixed to the section 12 by a bracket 58 is a flexible conduit 60 within which is carried for axial slidable movement a wire 62 having one end fixed to the damper 34 at 64. The conduit 60 extends between adjacent slats 18 of the grille and is carried over the radiator 16 through a hole 66 in the dash and is fixed to the control 68. The control 68 is designed to be clamped to the instrument panel by an adjustable clamping screw 72. The operating shaft 74 which is rotated to open and close the shutters has a threaded portion 76 which passes through a block 78 which is axially reciprocable upon revolution of the shaft 74 in opposite directions. The wire 62 carried within the conduit 60 is connected to the block 78 by means of a set screw 80. In this manner manipulation of the shaft 74 will feed the wire 62 which raises and lowers the dampers 32 and 34.

Depending upon the shape and ornamentation of the grille, the shutters may be of two separate sections as shown or it may be entirely integral, or the sections may be hinged together or otherwise suitably associated. We prefer, however, to have the shutters of two separate sections as it facilitates handling in manufacture and enables compact packaging for shipment.

Having thus described our invention what we desire to protect by Letters Patent and claim is:

In combination with a radiator grille front of stream lined contour, an accessory shutter structure designed to be installed on the outside of the grille front comprising a pair of separate sheet metal sections of relatively rigid construction each adapted to cover equal portions of the grille front on opposite sides of its vertical center line, an opening in each of said sections, regulating means for varying the effective size of said openings supported upon said sections and located forward of said grille, said regulating means being associated with said sections as a unitary structure, attachment means upon said sections for enabling independent installation and removal of said sections to and from said grille, interlocking structure connected to said regulating means upon each section and coacting with each other with said sections in place upon said grille to lock said regulating means together so as to function as a unit, and control means directly connected to one of said regulating means and extending rearwardly through said grille for indirectly operating the other of said regulating means with simultaneous movement through said interlocking means.

EDGAR G. PETERSEN.
FREDERICK E. BEACH.